United States Patent [19]
Ilg

[11] 3,864,015
[45] Feb. 4, 1975

[54] VISUAL BEARING INSTRUMENT
[76] Inventor: Paul F. Ilg, 4065 Bunker Ln., Wilmette, Ill. 60091
[22] Filed: Oct. 26, 1973
[21] Appl. No.: 409,925

[52] U.S. Cl. .................................................. 350/81
[51] Int. Cl. ............................................. G02b 7/00
[58] Field of Search ........ 350/81; 33/333, 334, 347, 33/364

[56] References Cited
UNITED STATES PATENTS
| 877,313 | 1/1908 | Faehrmann | 350/81 |
| 1,104,643 | 7/1914 | Faehrmann | 350/81 |
| 2,396,133 | 3/1946 | Sherrill | 33/364 |

FOREIGN PATENTS OR APPLICATIONS
| 350,800 | 6/1905 | France | 350/81 |

Primary Examiner—James W. Lawrence
Assistant Examiner—Davis L. Willis
Attorney, Agent, or Firm—Davis, McCaleb & Lucas

[57] ABSTRACT

A special attachment device including a compass mounted intermediate between and at a level above the two barrel-like telescope housing portions of a binocular frame. The compass has an upright lubber line visible from the viewing end of the binoculars. The lubber line intersects the line of sight of the binoculars. In the embodiment shown, the binoculars are conventional, having two telescope housings interconnected about a common pivotal axis parallel to the line of sight. The compass has a mounting ring frictionally engaged with the external cylindrical surface at the objective end of one of the telescope housings. The compass is rotatable with the mounting ring on the above-mentioned external cylindrical surface to adjust the horizontal position of the compass and thereby compensate for relative pivotal movement between the telescope housings when the spacing between the eyepieces is adjusted for different observers.

6 Claims, 7 Drawing Figures

VISUAL BEARING INSTRUMENT

BACKGROUND OF THE INVENTION

Navigation at sea involves not only determining one's position from time to time incident to getting from one place to another, but, more importantly, getting there safely. With safety in mind, it is obvious that coastal navigation is an important concern. It is necessary sometimes to determine one's position quickly and accurately as when avoiding shoal areas or reefs or staying in a channel where markers have been lost or destroyed.

There are, of course, well known, excellent, sophisticated navigation instruments that can be used to guide a vessel or small boat successfully along coastal areas. However, these instruments are relatively expensive, complicated, and subject to failure. If they fail, often they cannot be repaired at sea, or this cannot be done quickly enough to fix a position in time of danger. Moreover, electrical failure on board completely eliminates the availability of such navigation instruments.

Thus, there should be on board at all times as a backup or as an adjunct to basic navigation instruments, good, accurate equipment which is virtually foolproof and requires no electrical power.

Most boatmen have a pair of binoculars such as the standard marine 7×50 and in the interest of safety they often have two aboard to extend their vision by day and night.

BRIEF SUMMARY OF THE INVENTION

A general object of the present invention is to augment the utility of the usual set or sets of binoculars carried by boatmen by providing a compass attachment device with the axis of the lubber line of the compass parallel to the line of sight of the binoculars to give the boatman a magnetic bearing on any object observed such as a lighthouse, a prominent land point, a buoy, or a channel marker. Then, by simple established methods of navigation and by use of an appropriate chart, his position can be located either by triangulation or by what is known as a running fix which involves taking two bearings on the same object and recording time, speed and direction between the bearings.

A specific object of the invention is to provide a compass attachment which can be readily mounted externally on any pair of binoculars and which can be provided so inexpensively that boatmen will not hesitate to buy them in pairs, one for primary use, and one for back-up.

Another object is to provide such a combination of a readily usable compass on a set of binoculars which is easily portable to the most desirable place on the vessel for best observation, day or night.

Another object of the invention is to provide a visual bearing instrument which can be used to advantage by surveyors, woodsmen, forest rangers, and wilderness explorers in determining their positions and locating bench marks or stake markers, and in performing surveys of large land tracts.

Briefly, the invention includes a visual bearing indicator attachment device to convert an ordinary set of binoculars into a visual bearing instrument for navigation and location purposes comprising a compass having a casing with an upright lubber line superposed on a movable compass card, the casing having a mounting ring in a vertical plane which is frictionally mountable on the external cylindrical surface which is commonly provided at one of the telescope housing end portions on the objective end of the binoculars, the compass being rotatable on that external cylindrical surface about the axis of one of the binocular objective lenses to level the compass when the spacing between the viewing lenses is adjusted for different observers.

BRIEF DESCRIPTION OF THE DRAWINGS

Other objects and advantages will be apparent from the following description taken in connection with the drawings in which.

Like parts are referred to by like reference characters throughout the figures.

DESCRIPTION OF THE PREFERRED EMBODIMENT

Figure 1:
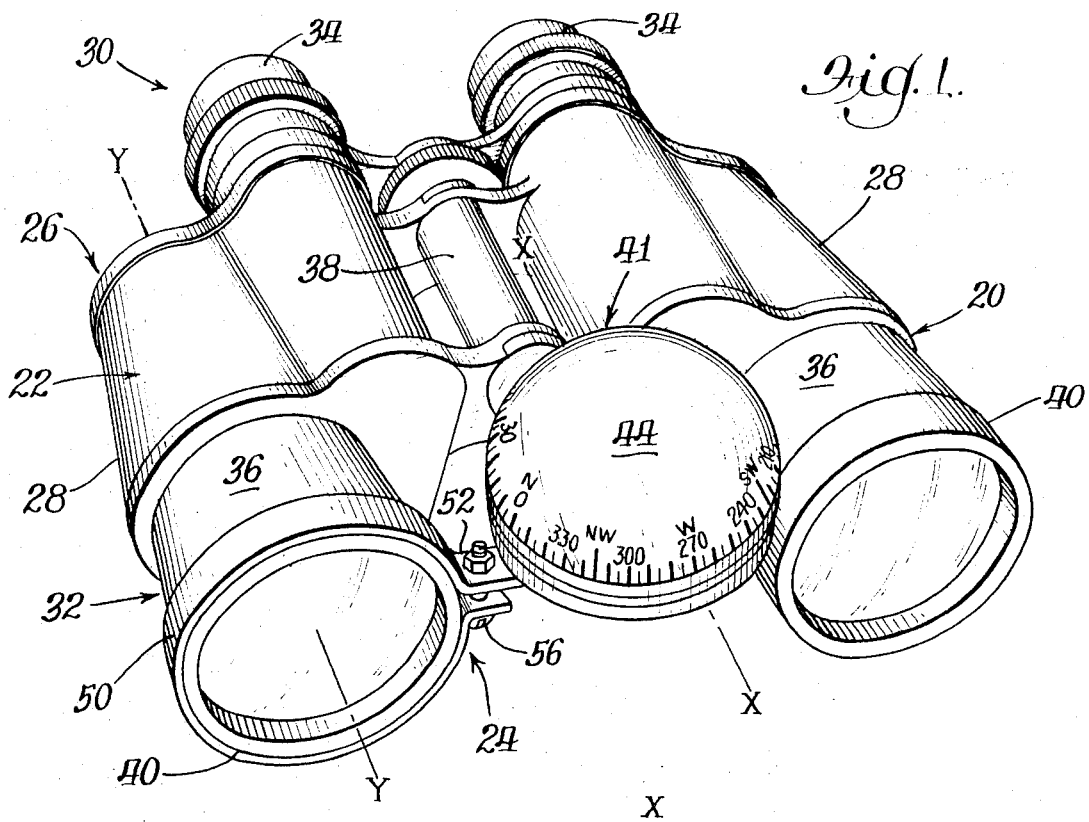
FIG. 1 is an overall perspective view of a visual bearing instrument illustrating a preferred form of the present invention employing a standard set of binoculars.
Figure 2:
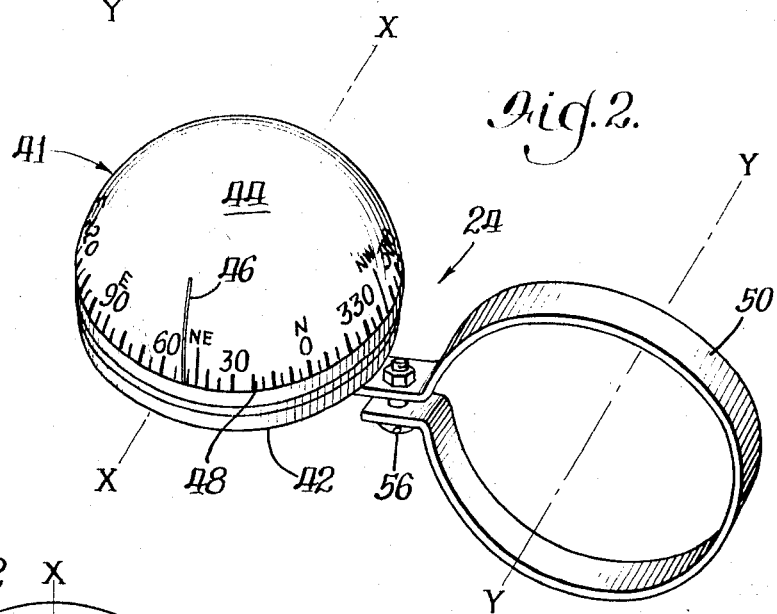
FIG. 2 is a perspective view of the visual bearing indicator compass attachment device shown on a standard set of binoculars in FIG. 1.

The preferred embodiment of the visual bearing instrument illustrated in the drawings is generally indicated 20. It comprises a conventional pair or set of binoculars 22 and a visual bearing indicator compass attachment device 24.

The binoculars have a frame generally indicated 26 including a pair of parallel optical telescope housings 28, 28. The frame has opposite viewing and objective end portions 30 and 32, respectively. The viewing end portion has the usual eyepieces 34 at the rear ends of the telescope housings, and the usual objective barrels 36 at the forward ends. The telescope housings are interconnected about a common pivotal axis, that is, the axis of longitudinal pivot shaft 38, for adjustment of the spacing between the eyepieces 34 to accommodate different observers. Each objective barrel 36 has an external cylindrical surface 40. Such cylindrical surfaces are commonly provided at the forward ends of binoculars, although they may vary somewhat in diameter and axial length. This makes it possible to use the compass attachment device 24 on all conventional binoculars.

The visual bearing indicator compass attachment device 24 is disposed externally of the binoculars, between and above the level of the telescope housings 28, 28, so it is readily visible for a user to determine a line-of-sight navigation or position bearing of some object viewed through the binoculars.

The device 24 has a compass 41 which comprises a disc-like base 42 and a clear glass or plastic semispherical envelope 44 with an upright lubber line 46 over a magnetically movable compass card 48 which is inside the envelope and has the usual "North," "South," "East" and "West" direction markings and 0° to 360° calibrations.

Figure 3:
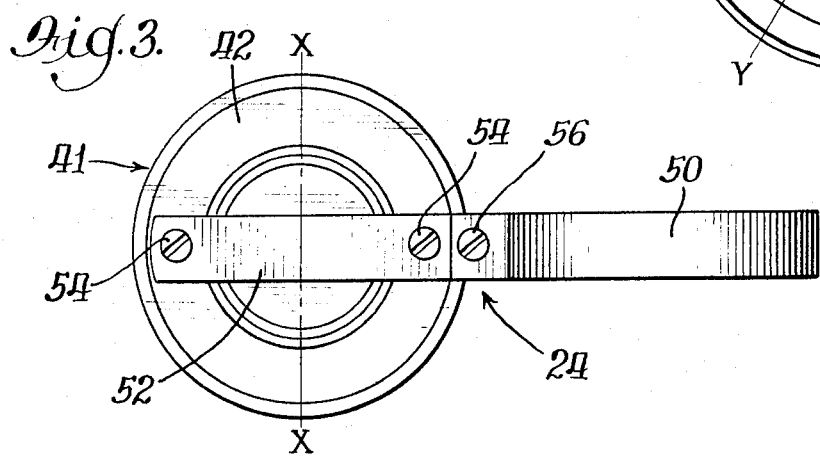
FIG. 3 is a bottom view of FIG. 2.
Figure 4:
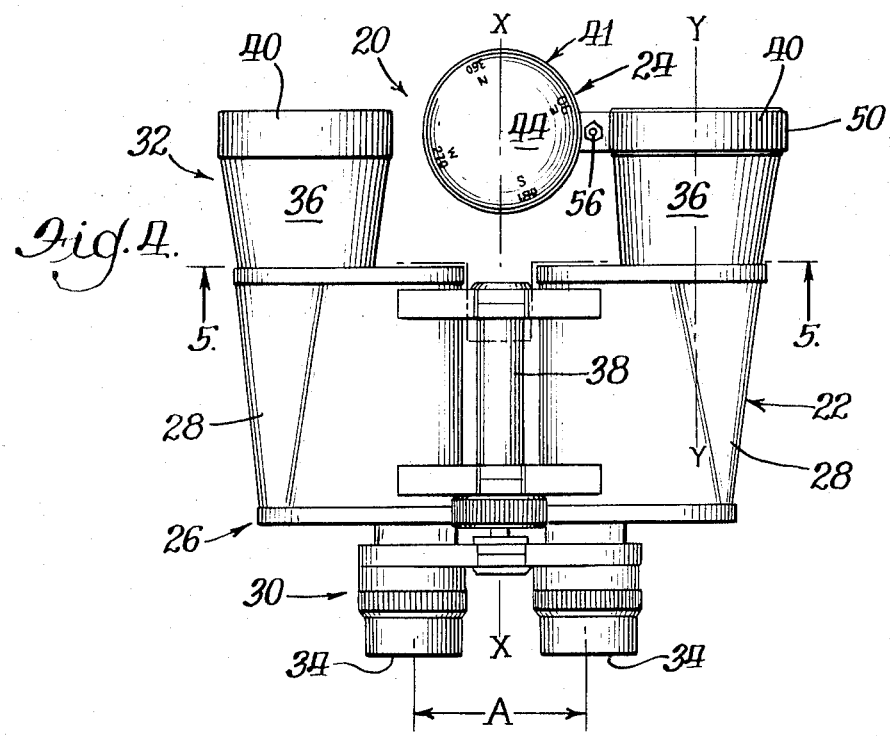
FIG. 4 is a top view of the visual bearing instrument shown in FIG. 1.

The device 24 also includes a mounting ring 50 which frictionally engages the right-hand cylindrical surface 40 as seen in FIG. 4. This is the left-hand cylindrical surface as seen in FIG. 1. The mounting ring has an extension 52 (FIG. 3) fastened as by screws 54 to the underside of the compass base 42. The ends of the mounting ring are clamped by an adjusting screw 56 which accommodates the ring to different diameters of surfaces 40 which are found on different binoculars, and provides a convenient way of adjusting the frictional grip so the compass may be rotated about the surface 40 when necessary to level the compass as will be explained in connection with FIGS. 5-7.

Figure 5:
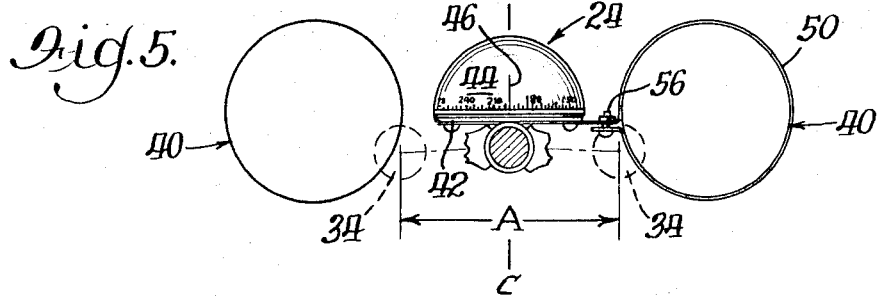
FIG. 5 is a vertical cross-sectional view of FIG. 4 taken along line 5—5 and showing the instrument adjusted to a maximum width extension where the spacing between the viewing lenses is at a maximum.
Figure 6:
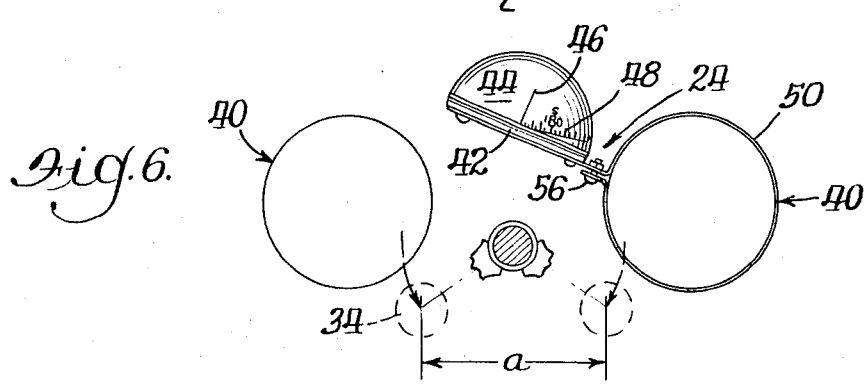
FIG. 6 is a view similar to FIG. 5 but showing an intermediate, inoperative position in which the two telescope housing portions of the binocular frame have been pivoted inward to bring the viewing lenses closer together, but the compass attachment not yet having been leveled.
Figure 7:
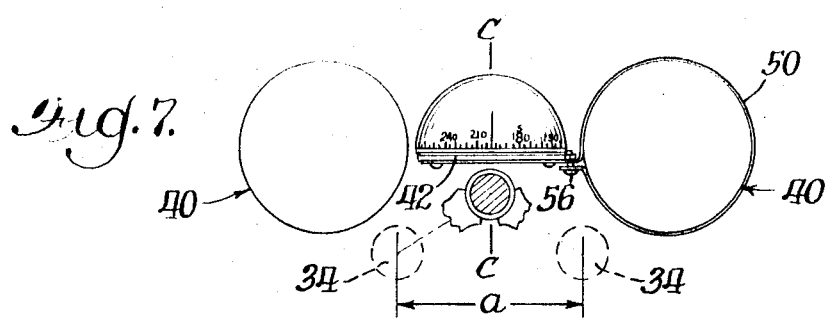
FIG. 7 is a view similar to FIG. 6 after the visual bearing indicator compass attachment has been leveled by rotating it counterclockwise about the axis Y—Y of the right-hand objective lens from the position shown in FIG. 6 to the level position shown in FIG. 7.

Referring to FIGS. 5-7, one of the important features of the present invention is that it is readily usable on any standard set of binoculars, by different observers. To illustrate the ease with which the visual bearing instrument may be transferred for use from one observer to another, assume first it is adjusted with a spacing A between the eyepieces, as shown in FIG. 5, for a person requiring a relatively wide spacing between the eyepieces 34. For his use, of course, the compass 41 will be level as shown in FIG. 5.

Now, assume the instrument is handed to another person requiring a much narrower spacing between the eyepieces 34. He adjusts it by the two movements shown in FIGS. 6 and 7. First, he pivots the two telescope frames about the shaft 38 to the position shown in FIG. 6, to space the eyepieces closer together as indicated by the dimension a. At this instant, as shown in FIG. 6, the compass 41 is skewed at a substantial, unusable angle. To correct this, the compass attachment is then merely rotated counterclockwise on the right-hand surface 40 to the level position shown in FIG. 7.

An important feature of the invention is that the upright lubber line 46 faces the back of the binoculars to be visible to the observer, and when the compass is leveled for use as shown in FIGS. 5 and 7 the lubber line (or a vertical extension thereof) is precisely on and intersected by the line of sight X—X of the binoculars. Alternatively, the lubber line may be described as being in a vertical plane C—C (FIGS. 5 and 7) containing the line of sight X—X. Another important feature is that the axis Y—Y of the surface 40 on which the mounting ring is attached is precisely parallel to the line of sight X—X and also to the axis of pivot shaft 38.

Use and operation are believed to be self-evident from the foregoing description. Briefly, to get a quick fix on an object of a known location, such as a lighthouse, mountain peak, buoy, or channel marker, the observer points the binoculars at it and thereby intersects it with the line of sight X—X. He then notes the compass reading. Then, by simple established methods of navigation and location and by the use of an appropriate chart or map, he can determine his position either by triangulation or by taking a running fix, that is, by taking two bearings on the same object and recording time, speed and direction between the bearings.

While one preferred embodiment of the present invention has been shown and described, it will be understood that various modifications may be made within the spirit and scope of the invention. The invention, therefore, should be limited only by the appended claims.

I claim:

1. In a visual bearing instrument including a binocular device comprised of a pair of parallel telescopic housings each having oppositely disposed viewing and objective end portions, the improvement comprising,
   a compass having a fixed vertical lubber line and a compass card movable in a horizontal plane relative to the lubber line,
   the surface of said compass card opposite the lubber line being in a plane having a vertical component,
   and means for mounting the compass on the binocular device with at least an extension of the vertical lubber line in the line of sight of the binocular device whereby the line and indicia on the card are visible from the viewing end portion externally of the binocular device.

2. In a visual bearing instrument according to claim 1 in which said means for mounting the compass is pivotally adjustable about an axis parallel to the line of sight of the binocular device.

3. In a visual bearing instrument according to claim 1 in which said housings are connected together for adjustment about a common axis which is parallel to the line of sight of the binocular device, and
   said means for mounting the compass comprises a ring frictionally engaging one of the housings and rotatable thereon to adjust the level of the compass after adjustment of the housings about the common axis.

4. In a visual bearing instrument according to claim 1 wherein the compass is disposed between the pair of housings.

5. A visual bearing instrument comprising:
   a binocular device having a frame including a pair of parallel telescope housings, said frame having opposite viewing and objective end portions, the telescope housings being interconnected about a common pivotal axis for adjustment of the spacing between them at said viewing end portion of the frame, at least one of the telescope housings having an external cylindrical surface at the objective end portion of the frame;
   a compass disposed externally between the telescope housings having a fixed upright lubber line and a movable compass card, the lubber line being on the line of sight of the binoculars parallel to the telescope housings and visible from the viewing end portion of the frame externally of the telescope housings, the compass having a mounting ring frictionally engaging said external cylindrical surface and being rotatable on said cylindrical surface about the corresponding telescope housing to adjust the horizontal position of the compass and thereby compensate for relative pivotal movement between the telescope housings when the spacing between them is adjusted.

6. A visual bearing instrument according to claim 5 including means for adjusting the diameter of said mounting ring to vary its frictional grip on said external cylindrical surface.

* * * * *